United States Patent Office 3,152,142
Patented Oct. 6, 1964

3,152,142
BENZIMIDAZOLE COMPOUNDS
Clarence L. Moyle, Clare, and Diomed M. Chern, Midland, Mich., assignors to The Dow Chemical Company, Midland, Mich., a corporation of Delaware
No Drawing. Filed May 24, 1962, Ser. No. 197,269
9 Claims. (Cl. 260—309.2)

This invention is directed to benzimidazole compounds, particularly (a) 2-(cyclohexylalkyl)benzimidazole compounds having the formula

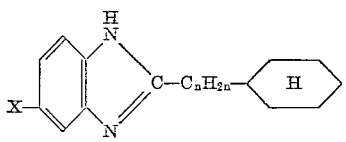

and (b) mineral salts of these compounds. In this and succeeding formulas, X may be —H, —R, —Cl, —Br, —COOH, —COOM, —COONH$_4$, —COOB or —COOR, and $n$ is an integer of from 1 to 3, inclusive; and wherein R is lower alkyl containing from 1 to 4 carbon atoms, inclusive, M is alkali metal and —COOB represents an amine salt group wherein the salt forming base is selected from lower alkylamines and lower alkanolamines; and wherein

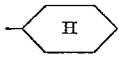

represents a cyclohexyl radical.

The expression "lower" as above employed indicates a carbon content of from 1 to 4, inclusive. By "alkali metal" is meant sodium, potassium and lithium. By "lower alkylamines" and "lower alkanolamines" are meant amine bases which have one or more lower alkyl or lower hydroxylalkyl radicals on the basic nitrogen and in which lower designates from 1 to 4 carbon atoms. Typical amine bases, A, which form with —COOH, the amine salt group, —COOB and which may also be designated —COOH·A, include methylamine, ethylamine, ethanolamine, isopropanolamine, methylaminoethanol, ethylaminoethanol, diethanolamine, isopropylamine, n-propylamine, n-butylamine, trimethylamine, diisopropylamine, N-methyl-isopropylamine, N-methyl-sec.-butylamine, 2-aminopropyl alcohol, isopropylaminoethanol, n-butylaminoethanol, bis(2-hydroxypropyl)amine, triethylamine, tri(n-butyl)amine, triisopropanolamine, triethanolamine, dimethylaminoethanol, diethylaminoethanol, dibutylaminoethanol, ethyldiethanolamine, dimethylamine, diethylamine and triisopropylamine.

The products of the present invention are white or light colored solids and are generally soluble in organic solvents such as acetone, lower alcohols and dimethylformamide. The products which are alkali metal or alkanolamine salts are soluble in water.

The products of the present invention are useful as pesticides, particularly for the control of water pests. The products are also useful as antimicrobial agents and as laboratory tools for the study of hypotensive and diuretic action.

The products of the present invention which may be represented by Formula II

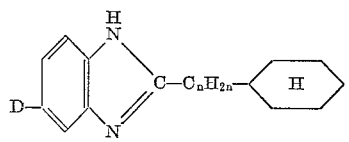

wherein D is —H, —R, —Cl, —Br or —COOH, may be prepared by reacting an appropriate o-phenylenediamine compound having the formula

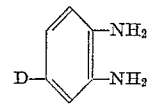

with an appropriate cyclohexanealkanoic acid in the presence of a mineral acid catalyst to produce the desired benzimidazole product which in the presence of the mineral acid forms a salt because of the basic nitrogen in the benzimidazole part of the structure. The mineral acid salt may be reacted with substantially equimolar proportions of a base such as ammonia to produce the desired benzimidazole product.

When the benzimidazole product is a benzimidazolecarboxylic acid, i.e., D in Formula II is —COOH, and which may be represented by the following formula

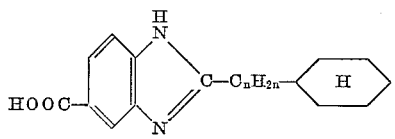

the basic solution obtained as above set forth is carefully acidified to pH of about 4.5 with hydrochloric acid to ascertain the formation of the free benzimidazolecarboxylic acid (IV).

In carrying out the reaction, the appropriate o-phenylenediamine compound, cyclohexanealkanoic acid and mineral acid catalyst are mixed together for a time sufficient to complete the reaction. The exact amounts of the reactants are not critical. Good results are obtained by employing substantially equimolar proportions of the o-phenylenediamine compound and cyclohexanealkanoic acid. The reaction takes place in the temperature range of from about 80° to about 130° C. Preferably, the reaction is carried out in a solvent; thus, the reflux temperature of the resulting solution provides a convenient reaction temperature. The most suitable solvents are water or mixtures thereof with lower alcohols. The o-phenylenediamine compounds are sometimes available commercially as hydrochlorides or as other mineral acid salts; such salts are, of course, suitable in the reaction. The reaction must be carried out in a medium which is definitely acidic. Many acids may be employed to render the medium acidic; aqueous mineral acids are preferred. In the event it is desired to prepare directly a mineral acid salt of a benzimidazole compound, the appropriate mineral acid is used to carry out the reaction. Thus, the acid may be hydrochloric, hydrobromic, phosphoric or sulfuric. If the free benzimidazole compound is desired, hydrochloric acid is convenient. The reaction is complete in from about 15 to 72 hours. As a result of these operations, the mineral acid salt of the benzimidazole is formed and may be recovered from the aqueous reaction mixture.

The salt may be purified, if desired, by conventional procedures. The free benzimidazole compound may be obtained from the mineral acid salt by reacting the salt with a base. A suitable base is ammonium hydroxide. The reaction is carried out by mixing the salt in aqueous medium with a sufficiency of base as to render the mixture slightly alkaline and generally warming for about from 0.5 to several hours, and thereafter cooling to precipitate the desired product. Where the desired benzimidazole product is a benzimidazolecarboxylic acid compound (IV), the basic solution is carefully acidified to pH of about 4.5 with hydrochloric acid to obtain the benzimidazolecarboxylic acid compound which precipitates in the reaction mixture. Wide variance in pH is not permissible inasmuch as excess acid will result in salt formation at the benzimidazole nitrogen while insufficient acid may still leave an ammonium salt at the carboxylic acid group. The benzimidazole product is recovered by filtration and may be purified, if desired, according to conventional procedures such as by treating with activated charcoal and/or by recrystallization from hot aqueous lower alcohol solution.

In a preferred method for carrying out this reaction, substantially equimolar proportions of the appropriate o-phenylenediamine compound and the appropriate cyclohexanealkanoic acid are mixed together in aqueous hydrochloric acid and heated at reflux temperature for from about 15 to 72 hours. At the end of this period, the mixture is allowed to cool to room temperature to obtain a benzimidazole hydrochloride product as precipitate. The latter may be recovered by filtration and washed. The hydrochloride with or without isolation and purification is warmed with substantially equimolar proportions of aqueous ammonia for about 1 to 2 hours and thereafter cooled; where the desired benzimidazole compound is a carboxylic acid (IV), the mixture is subjected to a further step of acidification to pH 4.5. As a result of these operations, the desired benzimidazole product is obtained as a precipitate. The product is recovered by filtration and purified by conventional procedures.

The benzimidazole compounds which are esters of benzimidazolecarboxylic acid compound, i.e., compounds wherein X in Formula I is —COOR, may be prepared by reacting the acid chloride derived from the appropriate benzimidazolecarboxylic acid (IV) with the appropriate alcohol, ROH, or its sodium salt, RONa. The exact amounts of the reactants are not critical, some product being obtained in any case; usually, it is convenient to employ free alcohol and in excess, the excess alcohol functioning as a solvent or reaction medium. The reaction may be carried out at from room temperature to the boiling point of the alcohol or auxiliary inert solvent, if present, and for a period of from several minutes to several hours. Conveniently, the acid chloride is prepared as the first step in the reaction by reacting thionyl chloride with the free acid (IV) in an inert solvent and thereafter reacting the acid chloride containing reaction medium with excess of the appropriate alcohol, ROH.

In a preferred method for carrying out the reaction, thionyl chloride is added dropwise to a solution of the appropriate benzimidazolecarboxylic acid compound (IV) in an inert solvent. Suitable solvents include dimethylformamide and chloroform. The reaction mixture is allowed to stand for several hours at ambient temperature to obtain the intermediate acid chloride. At the end of this period, an excess of the appropriate alcohol is added and the resulting mixture maintained in the temperature range of from about 15° C. to about 100° C. whereupon a reaction takes place to obtain the desired ester product. The product may be recovered from the reaction mixture by washing the reaction mixture with water, extracting the product with ether or other inert, water-immiscible solvent and thereafter vaporizing off the solvent.

The mineral acid salts of the benzimidazole compounds may be prepared from a previously prepared benzimidazole compound by reacting the appropriate benzimidazole compound with substantially equimolar proportions or slight excess of the appropriate mineral acid in an aqueous medium and thereafter recovering the salt product by evaporating to dryness. The hydrochloride salt may be prepared by an alternative procedure whereby dry hydrogen gas is passed through a dry ether or ether-alcohol solution of the benzimidazole compound to precipitate the desired benzimidazole hydrochloride compound.

The benzimidazole compounds of the present invention which are salts of benzimidazolecarboxylic acid compound, i.e., compounds wherein X in Formula I is —COOM, —COONH$_4$ or —COOB may be prepared by mixing and warming together, usually in aqueous medium, the appropriate benzimidazolecarboxylic acid compound (IV) prepared as above described, and the appropriate base and thereafter vaporizing off the water to recover the desired salt. Substantially equimolar proportions of the reactants are employed and the reaction may be carried out at room temperature or on a steam bath. If desired, the salt may be purified by conventional procedures.

The following examples illustrate the invention but are not to be construed as limiting:

EXAMPLE 1

*2-(2-Cyclohexylethyl)-5-Benzimidazolecarboxylic Acid*

10.0 grams (0.066 mole) of 3,4-diaminobenzoic acid, 12.5 grams (0.08 mole) of cyclohexanepropionic acid, 60 milliliters of water and 30 milliliters of 37 percent hydrochloric acid were mixed together and heated at reflux temperature for 48 hours to obtain a 2-(2-cyclohexylethyl)-5-benzimidazolecarboxylic acid product which in the presence of excess hydrochloric acid forms the acid salt. The reaction mixture was then diluted with 200 milliliters of water and allowed to cool to precipitate the 2-(2-cyclohexylethyl)-5-benzimidazolecarboxylic acid hydrochloride salt which was separated from the aqueous layer by decantation and then washed with ether. The crystalline salt was then mixed and warmed with dilute aqueous ammonium hydroxide solution, then cooled and acidified to pH of 4.5 with hydrochloric acid to precipitate a yellow semi-solid material. The latter was dissolved in 95% ethyl alcohol and treated with activated charcoal to remove undesirable impurities. The purified alcoholic solution was diluted with water and cooled to obtain the desired 2-(2-cyclohexylethyl)-5-benzimidazolecarboxylic acid product as light tan colored crystals melting at 140°–142° C. with decomposition.

EXAMPLE 2

*2-(2-Cyclohexylethyl)Benzimidazole*

In a similar manner, 22 grams (0.20 mole) of o-phenylenediamine, 31 grams (0.20 mole) of cyclohexanepropionic acid, 20 milliliters of concentrated hydrochloric acid and 40 milliliters of water were mixed together and heated at reflux temperature for 24 hours. The reaction mixture was then cooled to room temperature and concentrated ammonium hydroxide added thereto until the mixture was slightly alkaline to precipitate a crude 2-(2-cyclohexylethyl)benzimidazole product. The latter was recovered by filtration, washed with water, purified by treating a 95% ethyl alcohol solution thereof with activated charcoal and recrystallizing from alcohol-water to obtain a purified product as colorless plates having a melting point of 194°–195° C.

EXAMPLE 3

*5-Chloro-2-(Cyclohexylmethyl)Benzimidazole and Its Hydrochloride*

10.0 grams (0.07 mole) of 4-chloro-1,2-diaminobenzene, 10 grams (0.07 mole) of cyclohexaneacetic acid, 30 milliliters of concentrated hydrochloric acid and 60 milliliters of water were mixed together and heated at reflux temperature for 24 hours to obtain in the reaction mixture a hydrochloride salt of 5-chloro-2-(cyclohexylmethyl)benzimidazole. The reaction mixture was allowed to cool and filtered and washed to recover the hydrochloride salt having a molecular weight of 286.

The hydrochloride salt was then suspended in aqueous ammonia, heated for one hour, cooled, filtered to recover a crude solid product and the latter washed with water. The crude product was purified by treating a 95% ethyl alcohol solution thereof with activated charcoal and recrystallized from alcohol-water to obtain the desired 5-chloro-2-(cyclohexylmethyl)benzimidazole product as colorless crystals having a melting point of 188°–190° C.

EXAMPLE 4

*2-(3-Cyclohexylpropyl)Benzimidazole*

In a similar manner, 20.4 grams (0.012 mole) of cyclohexanebutyric acid, 8.6 grams (0.08 mole) of o-phenylenediamine, 20 milliliters of concentrated hydrochloric acid and 40 milliliters of water were mixed together and the resulting mixture heated at reflux temperature for 24 hours. The resulting mixture was warmed with aqueous ammonia and cooled to obtain a 2-(3-cyclohexylpropyl)benzimidazole product. The latter was recovered by filtration, purified by treating a 95 percent ethanol solution with activated charcoal, and recrystallizing from ethanol-water to obtain a purified product as white crystals melting at 152°–153° C.

EXAMPLE 5

In a similar manner, the following compounds are prepared:

2-(cyclohexylethyl)-5-methylbenzimidazole having a melting point of 223°–224° C. by the reaction of 3,4-toluenediamine dihydrochloride and cyclohexanepropionic acid in hydrochloric acid followed by reaction with aqueous ammonia.

2-(3-cyclohexylpropyl)-5-methylbenzimidazole having a melting point of 152°–153° C. by the reaction of 3,4-toluenediamine dihydrochloride and cyclohexanebutyric acid in hydrochloric acid followed by reaction with aqueous ammonia.

5-chloro-(2-cyclohexylethyl)benzimidazole having a molecular weight of 263.5 by the reaction of 4-chloro-1,2-diaminobenzene and cyclohexanepropionic acid in hydrochloric acid followed by reaction with aqueous ammonia.

5-chloro-2-(3-cyclohexylpropyl)benzimidazole having a melting point of 94°–97° C. by the reaction of 4-chloro-o-phenylenediamine and cyclohexanebutyric acid in hydrochloric acid followed by reaction with aqueous ammonia.

5-bromo-2-(3-cyclohexylpropyl)benzimidazole having a molecular weight of 322 by the reaction of 4-bromo-o-phenylenediamine and cyclohexanebutyric acid in hydrochloric acid followed by reaction with aqueous ammonia.

5-bromo-2-(2-cyclohexylethyl)benzimidazole having a molecular weight of 308 by the reaction of 4-bromo-o-phenylenediamine and cyclohexanepropionic acid in hydrochloric acid followed by reaction with aqueous ammonia.

2-(3-cyclohexylpropyl)-5-ethylbenzimidazole having a molecular weight of 270 by the reaction of 4-ethyl-o-phenylenediamine and cyclohexanebutyric acid in hydrochloric acid followed by reaction with aqueous ammonia.

2-(2-cyclohexylethyl)-5-isopropylbenzimidazole having a molecular weight of 270 by the reaction of 4-isopropyl-o-phenylenediamine and cyclohexanepropionic acid in hydrochloric acid followed by reaction with aqueous ammonia.

2-(cyclohexylmethyl)-5-sec.-butylbenzimidazole having a molecular weight of 270 by the reaction of 4-sec.-butyl-o-phenylenediamine and cyclohexaneacetic acid in hydrochloric acid followed by reaction with aqueous ammonia.

2-(cyclohexylmethyl) - 5 - benzimidazolecarboxylic acid having a molecular weight of 258 by the reaction of 3,4-diaminobenzoic acid and cyclohexaneacetic acid in hydrochloric acid followed by reaction with aqueous ammonia and then acidification to pH 4.5 with hydrochloric acid.

2-(3-cyclohexylpropyl) - 5 - benzimidazolecarboxylic acid having a molecular weight of 286 by the reaction of 3,4-diaminobenzoic acid and cyclohexanebutyric acid in hydrochloric acid followed by reaction with aqueous ammonia and then acidification to pH 4.5 with hydrochloric acid.

EXAMPLE 6

*Ethyl 2-(2-Cyclohexylethyl)-5-Benzimidazole carboxylate*

2 milliliters of thionyl chloride is added dropwise to a solution of 5.4 grams (0.02 mole) of 2-(2-cyclohexylethyl)-5-benzimidazolecarboxylic acid in 25 milliliters of dimethylformamide and the resulting mixture allowed to stand for several hours. Thereafter, 25 milliliters of anhydrous ethyl alcohol is added and the reaction mixture allowed to stand at room temperature for several hours. At the end of this period, the mixture is warmed on a steam bath for about 15 minutes to complete the reaction, cooled, diluted with water and extracted with diethyl ether. The ether is removed by vaporization to obtain as residue the desired ethyl 2-(2-cyclohexylethyl)-5-benzimidazolecarboxylate having a molecular weight of 300.

EXAMPLE 7

In similar operations, the following esters are prepared:

n-Butyl 2-(2-cyclohexylethyl)-5-benzimidazolecarboxylate having a molecular weight of 328 by the reaction of 2-(2-cyclohexylethyl)-5-benzimidazolecarboxylic acid and thionyl chloride to form the intermediate acid chloride, followed by the reaction of the latter with n-butyl alcohol.

n-Propyl 2-(cyclohexylmethyl)-5-benzimidazolecarboxylate having a molecular weight of 300 by the reaction of 2-(cyclohexylmethyl)-5-benzimidazolecarboxylic acid and thionyl chloride to form the intermediate acid chloride, followed by the reaction of the latter with n-propyl alcohol.

Methyl 2-(3-cyclohexylpropyl)-5-benzimidazolecarboxylate having a molecular weight of 300 by the reaction of 2-(3-cyclohexylpropyl)-5-benzimidazolecarboxylic acid and thionyl chloride to form the intermediate acid chloride, followed by the reaction of the latter with methanol.

EXAMPLE 8

The alkali metal, ammonium and amine salts of the benzimidazolecarboxylic acid compounds are prepared by mixing together the benzimidazolecarboxylic acid and base in substantially equimolar proportions, generally in aqueous solvent and thereafter evaporting to dryness: sodium 2 - (2 - cyclohexylethyl)-5-benzimidazolecarboxylate, M.W. 294; ammonium 2-(2-cyclohexylethyl)-5-benzimidazolecarboxylate, M.W. 289; 2-(2-cyclohexylethyl)-5-benzimidazolecarboxylic acid, diethanolamine salt, M.W. 377; 2-(3-cyclohexylpropyl)-5-benzimidazolecarboxylic acid, ethanolamine salt, M.W. 347; potassium 2-(3 - cyclohexylpropyl) - 5 - benzimidazolecarboxylate, M.W. 324; lithium 2-(cyclohexylmethyl)-5-benzimidazolecarboxylate, M.W. 264; 2-(cyclohexylmethyl)-5-benzimidazolecarboxylic acid, isopropanolamine salt, M.W. 333.

EXAMPLE 9

The following mineral acid salts are prepared by reacting substantially equimolar proportions of the benzimidazole compound prepared as previously described and the appropriate mineral acid by mixing together in aqueous medium and warming together on a steam bath, then vaporizing off the water to recover the desired salt as residue: 2-(2-cyclohexylethyl)benzimidazole.HBr, M.W. 309; 2-(3-cyclohexylpropyl)benzimidazole.H₂SO₄, M.W. 340; 2-(2-cyclohexylethyl-5-methylbenzimidazole.H₂SO₄, M.W. 340; 2-(3-cyclohexylpropyl) - 5 - methylbenzimidazole.H₃PO₄, M.W. 354; 5-bromo-2-(3-cyclohexylpropyl) benzimidazole.H₃PO₄, M.W. 420.

EXAMPLE 10

*5-Chloro-2-(2-Cyclohexylethyl)Benzimidazole Hydrochloride*

5-chloro-(2-cyclohexylethyl)benzimidazole was prepared in a manner similar to that previously descrbied and an ethanolic-ether solution thereof added slowly with stirring to a cold hydrogen chloride saturated ether solution to obtain a 5-chloro-2-(2-cyclohexylethyl)benzimidazole hydrochloride product as white crystals melting at 280° C. with decomposition.

The products of the present invention are useful as pesticides for the control of such undesirable species as trash fish, bacteria and fungi, and insects. In a representative operation for the control of water pests, complete controls of *Carassius auratus,* a member of the carp family, were obtained when these aquatic pests in aqueous media were separately exposed to 2-(2-cyclohexylethyl)-5-benzimidazolecarboxylic acid and 5-chloro-2-(2-cyclohexylethyl)benzimidazole hydrochloride at a concentration of 4 parts by weight per million parts by weight of medium. The products also have pharmacological properties as hypotensive agents and diuretic agents rendering them suitable for laboratory studies in the mechanism of drug action.

The reactant cyclohexanealkanoic acids are available commercially. Similarly, the reactant o-phenylenediamine compounds are generally available. The latter may be prepared by various methods reported in the literature. Conveniently, they may be prepared from the corresponding chloro-nitro compound wherein the chloro group is aminated by heating at autogenous pressure with ammonia and the nitro group is reduced by heating in a bomb at about 30° C. with hydrogen in the presence of Raney nickel catalyst at pressures of about 500 pounds per square inch.

We claim:
1. A benzimidazole compound selected from the group consisting of (*a*) compounds having the formula

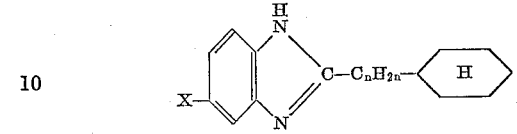

and (*b*) mineral acid salts of (*a*), wherein X is selected from the group consisting of —H, —R, —Cl, —Br, —COOH, —COOM, —COONH₄, —COOB and —COOR; *n* is an integer of from 1 to 3, inclusive; and wherein R is lower alkyl containing from 1 to 4 carbon atoms, inclusive, M is alkali metal and —COOB represents an amine salt group wherein the salt forming base is selected from lower alkylamines and lower alkanolamines; and wherein

represents a cyclohexyl radical.
2. 2-(2-cyclohexylethyl) - 5 - benzimidazolecarboxylic acid.
3. 5-chloro-2-(2-cyclohexylethyl)benzimidazole hydrochloride.
4. 5-chloro-2-(cyclohexylmethyl)benzimidazole.
5. 2-(3-cyclohexylpropyl)benzimidazole.
6. 2-(2-cyclohexylethyl)benzimidazole.
7. 2-(2-cyclohexylethyl)-5-methylbenzimidazole.
8. 2-(3-cyclohexylpropyl)-5-methylbenzimidazole.
9. 5-chloro-2-(3-cyclohexylpropyl)benzimidazole.

References Cited in the file of this patent

Jerchel et al.: J. Liebig's Annalen der Chemie, vol. 575, pp. 162–173 (1952).

German application 1,064,951, September 10, 1959.